United States Patent Office 3,288,765
Patented Nov. 29, 1966

3,288,765
EMULSION POLYMERIZATION TECHNIQUES
Leo J. Novak, Union, John J. Miskel, East Orange, and Walter Schlesinger, Westfield, N.J., assignors to White Laboratories, Inc., Kenilworth, N.J., a corporation of New Jersey
No Drawing. Filed Sept. 9, 1963, Ser. No. 307,379
12 Claims. (Cl. 260—80.3)

This invention relates to an improved process for the preparation of basic linear or cross-linked polymers. More particularly, this invention relates to the preparation of basic linear or cross-linked polymers in controllable particulate form by emulsion polymerization techniques wherein aqueous systems containing alkali metal silicates, polysilicates or congeners thereof are used as the continuous phase.

The basic linear and cross-linked polymers prepared according to the process of this invention are swellable resins which serve as pharmaceuticals and as intermediates in the preparation of more complex molecules. Previous attempts to obtain uniform, dry, purified particles or granules of basic linear or cross-linked polymers such as, for example, poly-(2-vinyl pyridine), through conventional emulsion polymerization techniques have failed. Either large lumps, difficult to purify from tacky polymeric impurities, are obtained, or low yields of highly cross-linked polymer may result. Although it has been suggested that such results are due primarily to an excessive selective partial solubility of the basic monomer in the continuous phase of the agitated emulsion, no effective means or overcoming this difficulty has been proposed to-date.

The instant invention is based upon the discovery that water-miscible alkali metal silicates, polysilicates or congeners thereof, when dispersed in an aqueous phase, give suitable emulsions of basic monomeric systems for the production of purified dry cross-linked or linear basic polymers in suitable controlled particle or granule size. In contrast to previous processes, aqueous systems having such silicates dispersed therein give small uniform particles of purified dry cross-linked or linear basic polymer in high yield and with optimum processing efficiency and conveniences. Further, the particle size is controllable, under otherwise constant conditions of polymerization, purification and isolation, by controlling the ratios of the amounts of reactants in the emulsified discontinuous monomer phase system and the amount of basic monomer phase to that of alkali metal silicate aqueous system.

While applicants do not wish to be confined to any particular theory as to the mode of operation of the alkali metal silicates in the process of this invention, it is believed that the great agglomerating tendency of the globules of discontinuous basic monomeric systems phases of the emulsion during their conversion to cross-linked or linear basic resin particles which heretofore has been observed is prevented in the process of the instant invention because:

(1) Alkali metal silicates, sesquisilicates, metasilicates, orthosilicates, disilicates or polymers thereof, when miscible in water, form therein at temperatures ranging from 25 to 100° C. compounds containing water of hydration and/or bound water. Soluble alkali metal silicates also bind water as water of hydration not only in the solid state but in the dispersed aqueous phase at temperatures up to 100° C. Such silicates, therefore, give high viscosities at high solids concentration thereby imparting increased stability to the emulsion even at temperatures as high as 100° C.

(2) Such alkali metal silicates or polymers thereof may be considered substances consisting of a strong base combined with a weak acid. They give a high pH in water which decreases the solubility of the basic monomeric system in the continuous phase.

In addition, the use of alkali metal silicates in the process of this invention permits the subsequent purifying processing of the resulting resin particles without inefficient acid swelling; such acid swelling being one method heretofore employed for extracting linear polymeric impurities. Because the unswollen particles have a higher surface to volume ratio, they may be extractively purified from tacky polymeric and other impurities with boiling water and/or injectable steam. Such extractive media can be drained away from the unswollen resin particles which then can be conveniently dried. The entire operation (e.g. polymerization, purification, and drying) can all be carried out in a single vessel which makes for optimum processing efficiency and lower preparation costs. Finally, it has been observed that the basic cross-linked or linear polymer particles obtained by the process of this invention are not excessively sticky or tacky after completion of polymerization, particularly in aqueous systems around 100° C., which permits rapid draining of the hot aqueous system therefrom with resulting high extractive, purification and drying efficiency.

For the preparation of basic linear polymers, the instant invention contemplates that a suitable basic monomeric material will be caused to undergo emulsion polymerization in the presence of a polymerization catalyst or initiator. By "suitable basic monomeric material" is meant one or a mixture of any aliphatic, heterocyclic or cylic organic monomer, capable of both homopolymerization and copolymerization, which, when shaken with water, give a pH in the aqueous layer greater than 7.0. Typical of such basic monomers, are, for purpose of illustration merely, amino styrenes, vinyl pyridines, vinyl morpholines, vinyl quinolines, substituted vinyl amines, vinyl quinidines, vinyl amidines, vinyl pyrroles, vinyl pyrrolines, vinyl pyrrolidines, allylamines, vinyl pyrazoles, ethylene imines, vinyl imidazoles and vinyl indoles. Suitable polymerization catalysts or initiators contemplated within the scope of this invention include, for example, benzoylperoxide, 2,2'-azobisisobutryonitrille, potassium persulfate, laurylperoxide, acetylperoxide, di-tertiary butylperoxide, cumene hydroperoxide, tetra-phenylsuccinodinitrile, tetra-p-methoxy-phenylsuccinodini-rile, etc., that is, a catalyst or initiator material which will cause homopolymerization or copolymerization of the basic monomeric materials described above as well as concomitant copolymerization of said basic monomeric materials with diunsaturated cross-linking materials hereinafter described. The catalyst is usually employed in an amount of between 0.01 and 1.0 percent by weight of the basic monomeric material.

For the preparation of basic cross-linked polymers, the instant invention contemplates that a basic monomeric material as described above, in the presence of a polymerization catalyst or initiator as described above, will be caused to undergo emulsion polymerization in admixture with from about 0.01 to 5.0 percent by weight of said basic monomeric material of a diunsaturated or polyunsaturated copolymerizable cross-linking monomeric material. Suitable "polyunsaturated copolymerizable cross-linking monomeric materials" (containing at least two double bonds), will include any one or a mixture of, for example, butadiene,
N,N-diallylacrylamide,
diallylamine,
diallylmethacrylamide,
2,5-dimethyl-3,4-dihydroxy-1,5-hexadiene,
2,5-dimethyl-2,4-hexadiene, divinylbenzene,
divinyl ether of diethylene glycol,
isoprene,
trivinylbenzene,
2,7-dimethyl-1,7-octadiene,
1,7-octadiene,
p-diisopropenylbenzene,
1,3,5-triisopropenylbenzene,
p,p'-diisopropenyldiphenylmethane,
1,1,3,5-tetrallyl-1,3-propanediol,
1,1,3,3-tetrallyl-1,3-propanediol,
1,1,3,3-tetramethyl-1,3-propenediol,
4,6-dimethyl-4,6-dihydroxy-1,8-nonadiene,
2,4,6,8-tetramethyl-4,6-dihydroxy-1,8-nonadiene,
nonadiene-1,8, and
2,8-dimethylnonadiene-1,8,
4,4'-divinylbiphenyl,
divinylpyridine,
N,N'-methylene-bis-acrylamide, divinylsulfone, and diacrylic acid esters of aliphatic and aromatic alcohols such as tetraethylene and/or polyethylene glycol dimethylacrylate; that is, a material which contains two or more double bonds subjected to cross-linkage with the basic monomeric materials previously described and which may be either aromatic, heterocyclic or aliphatic. It is usually desirable that the amount of polyunsaturated cross-linking monomeric material employed does not usually exceed about 5.0 percent by weight of the basic monomeric material since the acid swelling characteristics of the resulting polymeric product with most cross-linkers may be impaired at higher concentrations.

The novel concept of the instant invention comprises the homopolymerization or copolymerization of the foregoing materials by emulsion polymerization techniques wherein water-miscible alkali metal silicates, polysilicates or congeners thereof are dispersed in the aqueous (i.e., continuous) phase. Water-miscible alkali metal silicates, polysilicates or congeners thereof which are suitable for use in the process of the instant invention include all such silicates having ratios of metal oxide to silicon dioxide which (1) give uniform alkaline mixtures with water and (2) give viscosities significantly greater than water at polymerization temperatures (i.e., from about 25° to 100° C.). Any of the alkali metal silicates, including for example, sodium, potassium, lithium and rubidium silicates, sesquisilicates, metasilicates and orthosilicates having varying proportions of alkali metal oxide to silicon dioxide content, mono-, di-, tri-, tetra- and polysilicates with or without added soluble alkali may be used. The silicates of sodium and potassium generally are preferred with sodium silicate ($Na_2O:SiO_2=1:3.2$) and potassium silicate ($K_2O:SiO_2=1:2.5$) being most desirable. The quantity of alkali metal silicate dispersed in the aqueous phase may vary from 50 to 1000 mg. per ml. Particularly desirable results are obtained when the alkali metal silicate is employed in a concentration sufficient to impart to the aqueous phase a density of from 20° to 58° Bé (Baumé), that is, from 208 to 920 mg. per ml. for sodium silicate having a 1:3.2 or a 1:1.95 ratio of metal oxide to silicon dioxide respectively.

In general, the polymerization is carried out by admixing in predetermined weight ratios weighted quantities of the basic monomeric material (i.e., one or a mixture of basic monomers), of the polyunsaturated copolymerizable cross-linking monomeric material (i.e., one or a mixture of cross-linking monomers) and of the polymerization catalyst or initiator. This monomeric system is then added to a rapidly stirred aqueous silicate system at a temperature between 25° and 100° C. to form the emulsion polymerization system. Usually, the emulsion polymerization system contains from 0.05 to 0.5 part by weight of the monomeric system per part of the aqueous silicate system; the preferred range being from 0.18 to 0.26 part of monomeric system per part of the aqueous silicate system. Stirring is continued at the selected temperature until polymerization is complete which usually requires from 1 to 4 hours. It should be noted that the emulsion polymerization system becomes a suspension polymerization as the liquid globules of the monomeric system polymerize and become hard particles. Upon completion of the polymerization, the resin particles are drained away from the silicate liquid and are then washed and/or boiled with water. The purified resin particles may then be dried in air at temperatures up to 150° C. but preferably between 25° and 100° C.

The following examples will more fully illustrate typical procedures of the instant invention but are not to be considered as limiting.

*Example 1*

Stir 1000 ml. of 40–42° Bé. sodium silicate at about 600 r.p.m. and heat to about 85° C. Add a homogeneous monomeric mixture containing 180 gm. of 2-vinylpyridine, 2.34 gm. of p,p'-diisopropenyl diphenyl methane and 0.54 gm. of azobisisobutyronitrile. Maintain the temperature of the emulsion at 85–92° C. for about 2 hours. Drain away the silicate liquid and wash the remaining polymer particles several times with hot water. Dry the polymer particles in air at a tempearture between 25 and 110° C. for about 24 hours to obtain particles having an average diameter between 1/16 and 1/32 inch.

*Example 2*

To obtain polymer particles having an average diameter between 1/32 and 1/64 inch, repeat the process of Example 1 using 2.16 gm. of p,p'-diisopropenyl diphenyl methane.

*Example 3*

To obtain polymer particles having an average diameter between 1/8 and 1/16 inch, repeat the process of Example 1 using 2.52 gm. of p,p'-diisopropenyl diphenyl methane.

*Example 4*

Rapidly stir 1000 ml. of 40° Bé. potassium silicate at about 85° C. To this aqueous silicate system, add the monomeric mixture of Example 1 and continue rapid stirring at 85–95° C. for about 3 hours. Drain away the silicate liquid and wash the remaining polymer particles several times with hot water. Dry the purified polymer particles in air at 100° C. for about 24 hours to obtain particles having an average diameter between 1/16 and 1/32 inch.

*Example 5*

Stir 1000 ml. of 40–42° Bé. sodium silicate at 400–600 r.p.m. and heat to about 85° C. Add a homogeneous monomeric mixture containing 180 gm. of 2-vinyl pyridine and 0.54 gm. of azobisisobutyronitrile. Continue stirring at 85 to 95° C. for about 2 hours. Drain away the silicate liquid and wash the remaining linear polymer particles several times with hot water. Dry the linear polymer particles in air at 100° C. for about 24 hours to obtain particles having an average diameter of approximately 0.006 inch.

*Example 6*

Stir 900 ml. of 27 percent potassium silicate at about 600 r.p.m. and heat to about 80° C. Displace the air above the liquid with nitrogen. Add a homogeneous monomer mixture containing 190 gm. of 2-methyl-5-vinyl pyridine, 2.5 gm. of N,N'-methylene bis-acrylamide and 0.6 gm. of lauroyl peroxide. Maintain the temperature at 85 to 95° C. and continue stirring for about 2 hours. Drain the polymer particles on a 100-mesh screen and wash several times with hot water. Dry in air at 100° C. for about 24 hours to obtain particles having an average diameter between 1/16 and 1/32 inch.

The following example illustrates the increased processing efficiency and convenience resulting from the process of this invention.

*Example 7*

Add to a 100 gallon glass lined jacketed reactor tank equipped with a low sweep agitator, a thermometer and a bottom valved 2 inch drain covered with an 80-mesh stainless screen, 625 lbs. of 40° Bé. sodium silicate. Heat the silicate to about 90° C. using an agitator speed of approximately 300 r.p.m. Add a homogeneous monomer mixture containing 81.4 lbs. of 2-vinyl pyridine, 1.06 lbs. of p,p'-diisopropenyl diphenyl methane and 0.244 lb. of azobisisobutyronitrile. Maintain a nitrogen atmospheric surface blanket in the tank. Continue stirring at about 90° C. for 2 hours. Open the bottom tank valve and rapidly drain the silicate liquid. Close the bottom valve and add 50 gallons of hot water. Agitate at 100 r.p.m. and boil the polymer-water system for about 5 minutes. Rapidly drain the water htrough the bottom tank valve. Repeat the washing several times. Drain. Agitate the washed polymer particles at about 24 r.p.m. and blow hot dry air at approximately 105° C. through the tank at 3500 c.f.m. (cubic feet per minute) for 45 minutes. Vacuum transfer the dry polymer particles to a storage container. Total process time is approximately 7 hours.

The subject matter which applicants regard as their invention is particularly pointed out and distinctly claimed as follows:

1. In a process for preparing basic linear polymers by emulsion polymerization techniques including the polymerization of a monomeric system comprising a weighed quantity of basic monomeric material subject to polymerization and between 0.01 to 1.0 percent by weight based on said basic monomeric material of a polymerization initiator, the improvement which comprises: adding said monomeric system to an agitated aqueous system having dispersed therein between 50 to 1000 mg. per ml. of a water-miscible alkali metal silicate to form the emulsion polymerization system.

2. The process of claim 1 wherein the alkali metal silicate is sodium silicate.

3. The process of claim 1 wherein the alkali metal silicate is potassium silicate.

4. In a process for producing basic cross-linked polymers by emulsion polymerization techniques including the polymerization of a monomeric system comprising a weighed quantity of basic monomeric material subject to polymerization, between 0.01 to 5.0 percent by weight based on said basic monomeric material of a polyunsaturated copolymerizable cross-linking monomeric material and between 0.01 to 1.0 percent by weight based on said basic monomeric material of a polymerization initiator, the improvement which comprises: adding said monomeric system to an agitated aqueous system having dispersed therein between 50 to 1000 mg. per ml. of a water-miscible alkali metal silicate to form the emulsion polymerization system.

5. The process of claim 4 wherein the alkali metal silicate is sodium silicate.

6. The process of claim 4 wherein the alkali metal silicate is potassium silicate.

7. A process for preparing a basic linear polymer by emulsion polymerization techniques which comprises: adding a monomeric system comprising a weighed quantity of 2-vinyl pyridine and between 0.01 to 1.0 percent by weight based on said 2-vinyl pyridine of azobisisobutyronitrile to an agitated aqueous system comprising 20° to 58° Bé. sodium silicate.

8. A process for preparing a basic linear polymer by emulsion polymerization techniques which comprises: adding a monomeric system comprising a weighed quantity of 2-vinyl pyridine and between 0.01 to 1.0 percent by weight based on said 2-vinyl pyridine of azobisisobutyronitrile to an agitated aqueous system comprising 20° to 58° Bé. potassium silicate.

9. A process for preparing a basic cross-linked polymer by emulsion polymerization techniques which comprises: adding a monomeric system comprising a weighed quantity of 2-vinyl pyridine, between 0.01 and 5.0 percent by weight based on said 2-vinyl pyridine of p,p'-diisopropenyl diphenyl methane and between 0.01 and 1.0 percent by weight based on said 2-vinyl pyridine of azobisisobutyronitrile to an agitated aqueous system comprising 20° to 58° Bé. sodium silicate.

10. A process for preparing a basic cross-linked polymer by emulsion polymerization techniques which comprises: adding a monomeric system comprising a weighed quantity of 2-vinyl pyridine, between 0.01 and 5.0 percent by weight based on said 2-vinyl pyridine of p,p'-diisopropenyl diphenyl methane and between 0.01 and 1.0 percent by weight based on said 2-vinyl pyridine of azobisisobutyronitrile to an agitated aqueous system comprising 20° to 58° Bé. potassium silicate.

11. A process for preparing a basic cross-linked polymer by emulsion polymerization techniques which comprises: adding a monomeric system comprising a weighed quantity of 2-vinyl pyridine, between 0.01 and 5.0 percent by weight based on said 2-vinyl pyridine of N,N'-methylene bis-acrylamide and between 0.01 and 1.0 percent by weight based on said 2-vinyl pyridine of lauroyl peroxide to an agitated aqueous system comprising 20° to 58° Bé. sodium silicate.

12. A process for preparing a basic cross-linked polymer by emulsion polymerization techniques which comprises: adding a monomeric system comprising a weighed quantity of 2-vinyl pyridine, between 0.01 and 5.0 percent by weight based on said 2-vinyl pyridine of N,N'-methylene bis-acrylamide and between 0.01 and 1.0 percent by weight based on said 2-vinyl pyridine of lauroyl peroxide to an agitated aqueous system comprising 20° to 58° Bé. potassium silicate.

No references cited.

JOSEPH L. SCHOFER, *Primary Examiner.*

H. I. CANTOR, *Assistant Examiner.*